US006538261B1

(12) United States Patent
McConnel et al.

(10) Patent No.: US 6,538,261 B1
(45) Date of Patent: Mar. 25, 2003

(54) WET LINE FLUID REMOVAL SYSTEM WITH OPTICAL SENSOR

(75) Inventors: Lee A. McConnel, Parkville, MO (US); William Edward Spencer, Kansas City, MO (US); Mark Duane Holt, Kansas City, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 39 days.

(21) Appl. No.: 09/698,665

(22) Filed: Oct. 27, 2000

(51) Int. Cl.[7] .............................................. G01N 21/49

(52) U.S. Cl. ...................... 250/577; 73/290 R; 73/293; 73/323; 137/565.16; 137/565.17; 417/36; 141/115; 141/120

(58) Field of Search .............................. 73/290 R, 293, 73/323; 137/565.16, 565.17; 417/36; 141/115, 120; 250/577

(56) References Cited

U.S. PATENT DOCUMENTS 3,995,169 A 11/1976 Oddon ....................... 250/577
4,082,959 A * 4/1978 Nakashima ................. 250/577
4,132,899 A * 1/1979 Shigemasa et al. ......... 250/577
4,396,353 A * 8/1983 MacDonald ................. 417/36
4,880,990 A * 11/1989 Rando ........................ 250/577
4,901,195 A 2/1990 Stemporzewski, Jr. ...... 361/217
5,204,819 A 4/1993 Ryan .......................... 364/465
5,359,522 A 10/1994 Ryan .......................... 364/465
5,367,175 A * 11/1994 Bobb ......................... 250/577
5,377,715 A 1/1995 Andenmatten et al. ....... 137/15
5,425,624 A * 6/1995 Williams ..................... 417/36
5,460,210 A 10/1995 Koeninger ................... 141/94
5,515,890 A 5/1996 Koeninger ................... 141/94
5,534,856 A 7/1996 Cadman ................ 340/825.34
5,699,049 A * 12/1997 Difiore ....................... 340/618
5,828,798 A * 10/1998 Hopenfeld ................... 385/12
5,842,374 A * 12/1998 Chang ...................... 73/290 R
5,913,180 A 6/1999 Ryan ........................... 702/45

* cited by examiner

*Primary Examiner*—Que T. Le
*Assistant Examiner*—Christopher W. Glass
(74) *Attorney, Agent, or Firm*—Jones, Walker, Waechter, Poitevent, Carrere & Denegre, L.L.P.

(57) ABSTRACT

A system for returning residual liquid remaining in a loading line to a liquid cargo container after loading or unloading of the cargo container. This system includes a liquid return line extending between the loading line and the cargo container. A pump is positioned to move liquid from the loading line, through the liquid return line, and into the cargo container. A vapor line communicates between a vapor space in the cargo container and the loading line. The system may include an optical liquid level sensor. The level sensor includes a light tube having two substantially straight sections joined by a substantially continuous curvature bend. The bend has a rounded cross-section and the light pipe is formed of a light conducting material. An optical emitter is positioned at the end of one of the straight sections of the pipe and an optical detector is positioned at the other straight section of the pipe. A micro-controller activates the optical emitter and monitors the optical sensor.

20 Claims, 6 Drawing Sheets

WET LINE FLUID REMOVAL SYSTEM WITH OPTICAL SENSOR

FIELD OF INVENTION

The present invention relates generally to liquid cargo tank transport vehicles. More particularly, the present invention relates to an apparatus and method for removing liquid from the loading lines of the cargo tank, after loading or unloading, in order to prevent leakage or spillage of the liquid if the loading lines should become damaged during transportation.

BACKGROUND OF THE INVENTION

Hazardous or volatile liquids such as gasoline or diesel fuel are typically transported in bottom loading cargo tanks. Normally, each cargo tank has four or five compartments with an external loading/unloading line (hereinafter “wet line”) mounted at the bottom center of each compartment. The cargo tank is loaded with liquid cargo which passes through the wet lines and into the compartments. After each compartment of the cargo tank is filled, a residual amount of liquid (perhaps 5–10 gallons) may remain in the associated wet line.

For safety reasons, it is desirable to not allow the volatile liquid to remain in the wet line during movement of the cargo tank from one site to the next. One method of removing the remaining liquid from the wet line is disclosed in U.S. Pat. No. 5,377,715 to Andenmatten, et al., which is incorporated by reference herein for this background explanation. The Andenmatten patent discloses a method of introducing compressed gas into the wet line in order to force the remaining liquid back into the cargo container via a fluid return line. However, if the compressed gas contains oxygen, it may mix with volatile vapors in the wet line to create a potentially explosive, pressurized vapor/oxygen combination. Even if an inert or non-oxygenated gas is pumped into the wet line, it still must remain in the wet line under pressure, putting stress on seals and posing the danger of unwanted escape into the environment. If the non-oxygenated gas is highly saturated vapor from the top of the cargo tank, the safety and environmental concerns regarding scaping gas are even greater. What is needed in the art is a method of returning the liquid to the cargo tank without pressurizing the wet line.

The present invention also includes an improved light tube optical sensor for determining when liquid is present in the wet lines. Existing light tube optical sensors such as U.S. Pat. No. 3,995,169 to Oddon have several shortcomings which hinder their use in environments such as wet lines. The Oddon optical sensor is a U-shaped light tube which receives light from a source at one end and under the proper circumstances, directs the light to a detector at the opposite end. When the refractive index between the light tube material (say 1.5 for glass) and the surrounding environment (say 1.0 for air) is significant, light tends to travel around the bend of the light tube and reaches the detector. Thus, when the bend of the light tube is surrounded by air, the detector can sense light. However, when the bend in the light tube becomes surrounded by a liquid having a higher refractive index (say 1.4 for gasoline), light largely exits the light tube and no longer reaches the detector. In this manner, it can be determined if a liquid has reached the level of the bend in the light tube.

The Oddon optical sensor has a light tube with flat surfaces at its bend. While this flat surface is intended to more efficiently direct light around the bend, it also is more likely to allow ambient light from outside the tube to enter and travel through the tube and be falsely interpreted by the detector. Additionally, Oddon uses a round, conventional light bulb spaced above several light tubes in order to inject light into all of these tubes. This is significant power wastage because light energy is propagated in all directions instead of being narrowly directed down the tubes. Moreover, Oddon is limited to determining whether or not the detector receives a certain amount of light energy. Oddon is not able to distinguish between a true signal (i.e. light coming directly from the light source) and a false signal (e.g. light exiting the tube, reflecting off a container wall, and re-entering the light tube). There is a need in the art for an optical sensor which overcomes the limitations found in prior art devices such as the Oddon sensor.

OBJECT AND SUMMARY OF INVENTION

It is an object of the present invention to provide a system for returning fluid in a wet line to the main cargo container without the necessity of pressurizing the wet line.

It is the further object of the present invention to provide a system with an improved optical level sensor.

Therefore the present invention provides a system for returning residual liquid remaining in a loading line to a liquid cargo container after loading or unloading of the cargo container. This system includes a liquid return line extending between the loading line and the cargo container. A pump is positioned to move liquid from the loading line, through the liquid return line, and into the cargo container. A vapor line communicates between a vapor space in the cargo container and the loading line.

The present invention further comprises an optical liquid level sensor. The level sensor includes a light tube having two substantially straight sections joined by a substantially continuous curvature bend. The bend has a rounded cross-section and the light pipe is formed of a light conducting material. An optical emitter is positioned at the end of one of the straight sections of the pipe and an optical detector is positioned at the other straight section of the pipe. A micro-controller activates the optical emitter and monitors the optical sensor.

DETAILED DESCRIPTION

Figure 1:
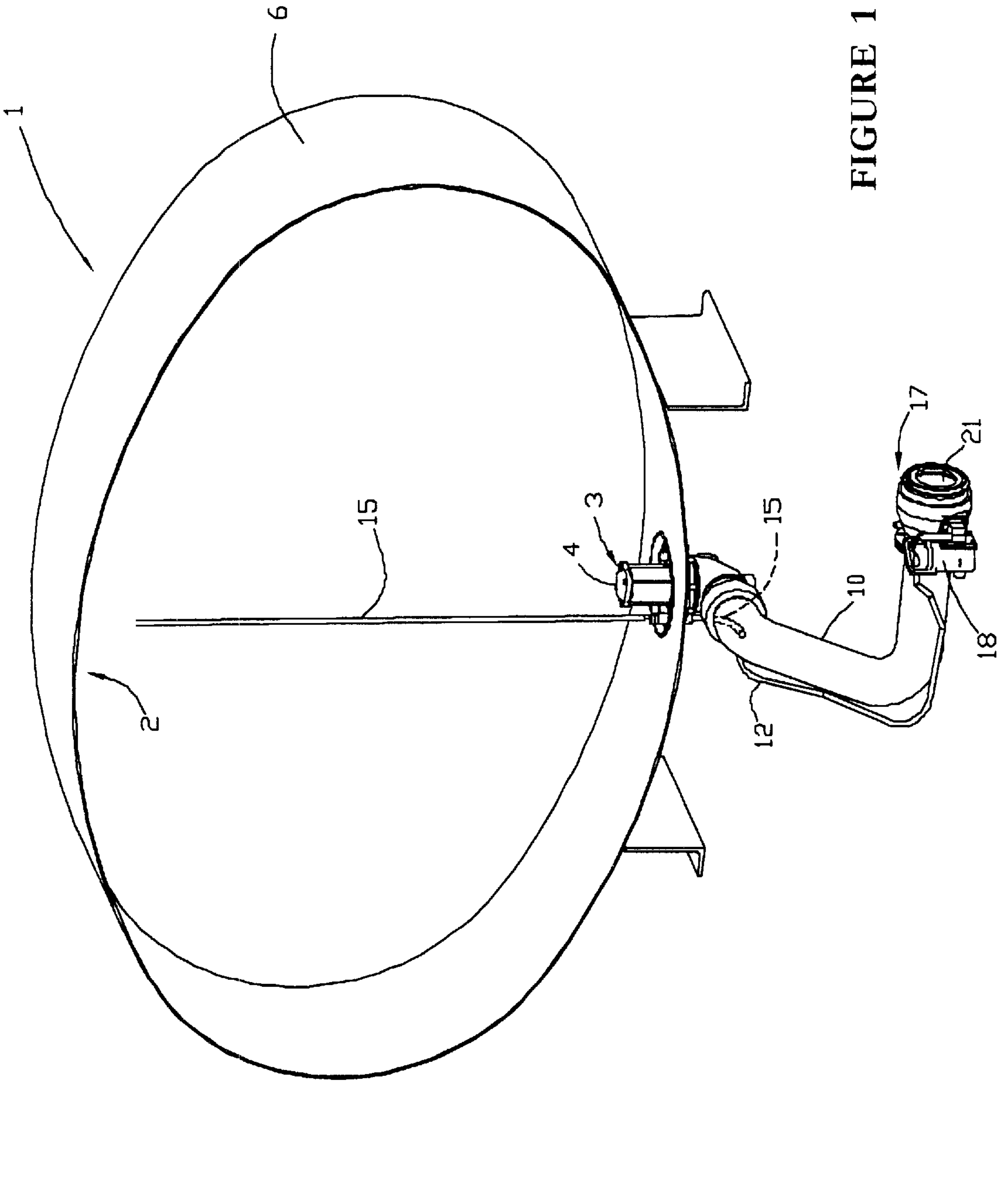
FIG. 1 illustrates a section of a cargo container with a wet line and the present invention integrated therein.
Figure 2:
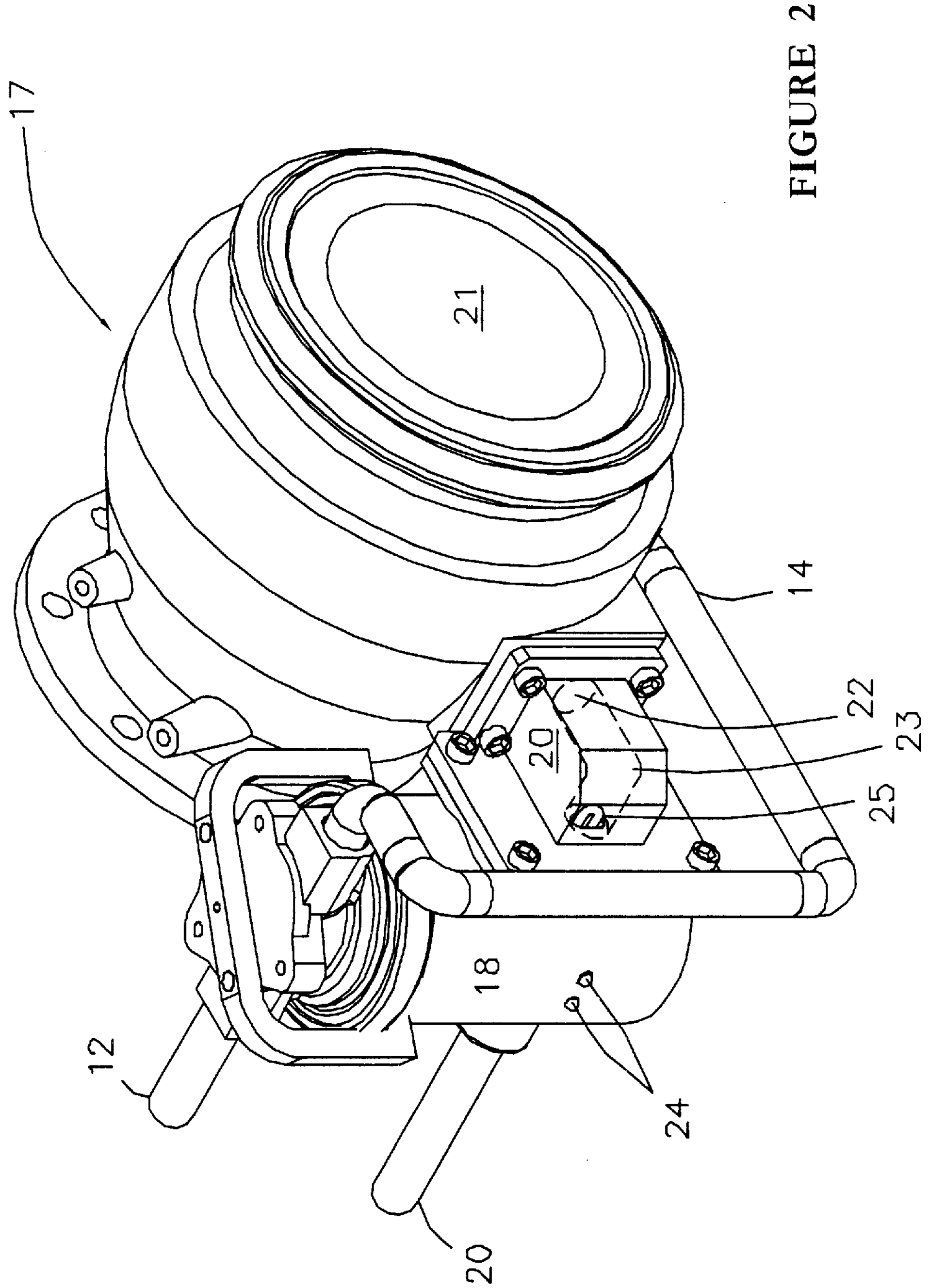
FIG. 2 illustrates a conventional API adapter with the pump and sensor of the present invention attached thereto.
Figure 3:
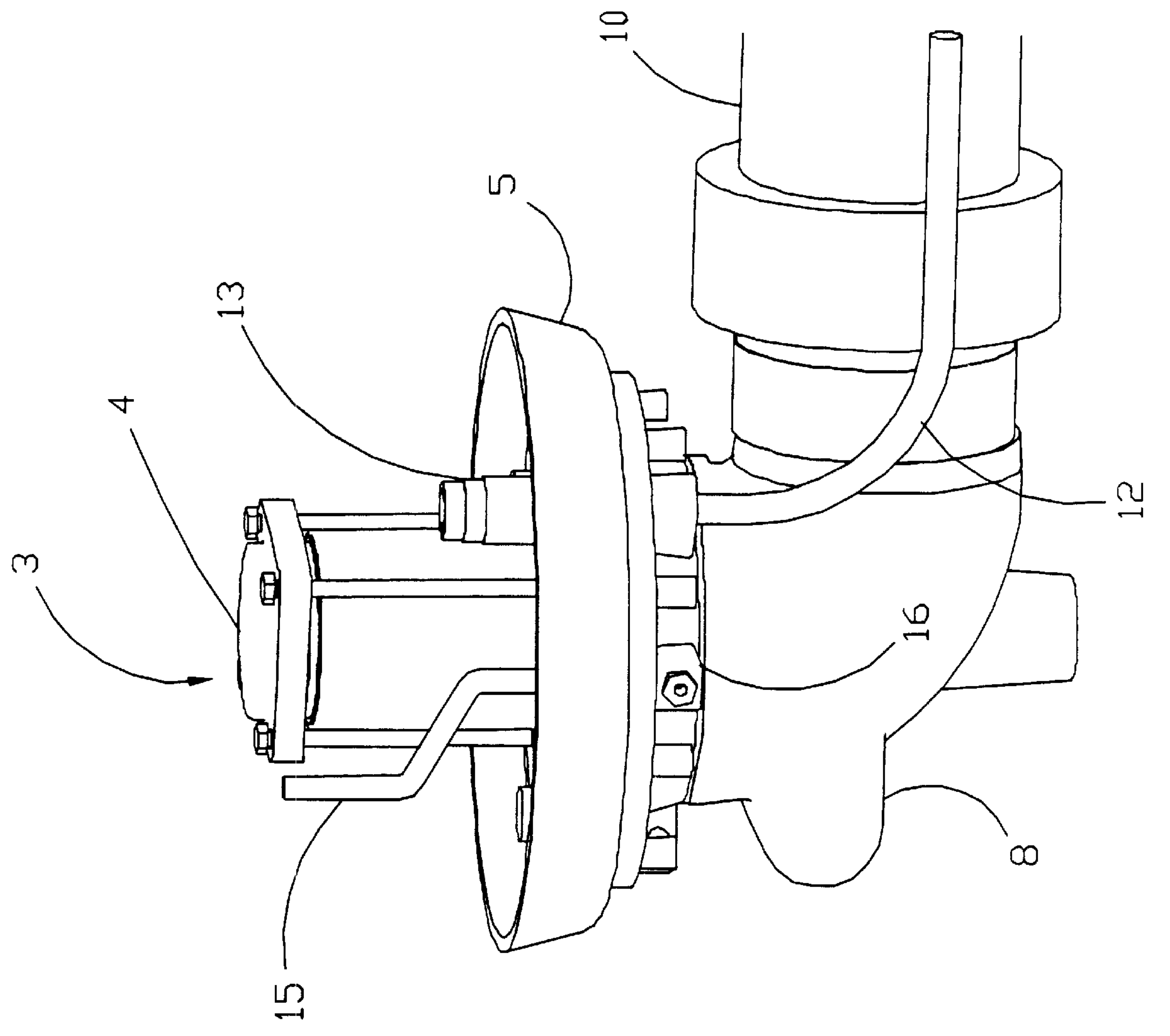
FIG. 3 illustrates a conventional bottom-loading valve with the vapor line and fluid return line of the present invention.

FIG. 1 represents a section taken from a conventional fluid cargo container 1 such as commonly used to transport gasoline and diesel fuel. This section includes the elliptical container wall 6 and a bottom loading valve assembly 3 located at the bottom of the cargo container 1. Typically, cargo container 1 will not be completely filled with fluid, but will have at least a small air space at the top of the container. When cargo container 1 transports fluids such as gasoline, evaporating fuel will rise to and saturate this top area, which is shown as vapor space 2 in FIG. 1. Valve assembly 3 includes an internal valve 4 which controls the flow of fluid into and out of container 1 through loading/unloading line (or "wet line") 10. A typical internal valve 4 can be seen in U.S. Pat. No. 5,244,181 to VanDeVyvere, which is incorporated by reference herein. The end of wet line 10 opposite valve assembly 3 is equipped with a conventional American Petroleum Institute (API) bottom-loading adapter 17. API adapter 17 provides the connection to large storage tanks for loading cargo container 1 and the connection to the smaller tanks (such as underground gasoline storage tanks) which are the final destination of the liquid cargo. It will be understood that API adapter 17 includes a poppet 21 which prevents fluid from exiting API adapter 17 when wet line 10 is not being used for loading or unloading. Normally when not being used for loading or unloading, the wet line is stored beneath cargo container 1 parallel to the length of the container with API adapter 17 positioned to be the lowest point along wet line 10. As discussed above, after loading or unloading operations, residual liquid is trapped in wet line 10 between valve assembly 3 and API adapter 17. Since it is desirable to return this residual fluid to the cargo container, the present invention modifies API adapter 17 to include a pump 18 as best seen in FIG. 2. A take-off line 14 extends from its connection with the bottom side of adapter 17 (not shown) to pump 18. Pump 18 draws fluid from adapter 17 and passes it into return fluid line 12. While various types of pumps could be employed, the pump 18 seen in the figures is an electric high capacity vane rotor fuel pump. As best seen in FIG. 1, return fluid line 12 runs between pump 18 and the interior of cargo container 1. FIG. 3 illustrates how internal valve assembly 3 is positioned (by bolts) within the sump 5 of the cargo container 1. It can be seen that fluid return line 12 will extend through the bottom of sump 5 and terminate at a check valve 13. It will be understood that check valve 13 operates to allow fluid to be pumped from line 12 into cargo container 1, but does not allow the contents of cargo container 1 to flow into line 12.

In order to prevent a vacuum being formed as fluid is pumped out of wet line 10, a vapor line 15 (see FIG. 1) extends from the interior of wet line 10, through sump 5, and into the vapor space 2 of cargo container 1. FIG. 3 shows the boss 16 through which vapor line 15 will travel as it transitions from inside wet line 10 past valve 4 and upwards toward vapor space 2. As fluid is pumped out of wet line 10, saturated vapors from vapor space 2 (see FIG. 1) will replace the fluid at or near ambient pressure. The saturated vapors contain too little oxygen to be combustible and the vapors are not under any significant pressure which would tend to stress the seals in wet line 10, thus the system lessens the likelihood of vapors escaping into the outside environment. The top of vapor line 15 should be high enough that it is never submerged by the fluid in cargo container 1. While not shown in the drawings, the top of vapor line 15 could be covered with a baffle or similar device. In the case that movement of the container causes waves and the like in the tank, the baffle would prevent or reduce fluid splashing into vapor line 15 while still allowing air to flow freely therein.

The running of return line 12 and vapor line 15 adjacent to and within valve 4, respectively, has several advantages. First, it allows easier installation of these lines because all modifications occur to sump 5 and valve 4 and do not require modification of the cargo container walls. Second, this placement of the lines will help protect the lines from being hit or damaged. While pump 18 (see FIG. 2) could be manually activated by an operator whenever it was desired to empty wet line 10, it is preferable to automate pump 18 to save the operator time and to insure wet line 10 is emptied regardless of the operator's attentiveness. Additionally, there may be circumstances where fluid accumulates in wet line 10 with out the operator's knowledge. For example, where internal valve 4 slowly leaks fluid into wet line 10 while the operator is towing a cargo container trailer from one location to another. An automated pump would insure no significant volume of fluid accumulated in wet line 10. Therefore, the present invention also includes a sensor which will detect when fluid is present in wet line 10, activate pump 18, and then turn off pump 18 when the fluid is removed. FIG. 2 illustrates optical sensor 25 extending from the body of pump 18 and interfacing with a channel 23 formed in block 20. Block 20 is connected to the side of API adapter 17 and an aperture 22 fluidly connects the interior of API adapter 17 with channel 23. It will be understood that aperture 22 communicates with API adapter 17 near the lowest point of the adapter's interior. Thus, any appreciable amount of fluid in API adapter 17 should flow into channel 23 and be detected by optical sensor 25. Two light emitting diodes (LED) 24 are shown on the side of pump 18 and are used to indicate various conditions such as whether there is fluid in wet line 10 or whether pump 18 is in operation. The optical sensor 25 seen in FIG. 2 will normally be fixed into place in the pump housing with a conventional potting material such as white PC-205, sold by Polycast International located in Bayshore, N.Y.

Figure 4A:
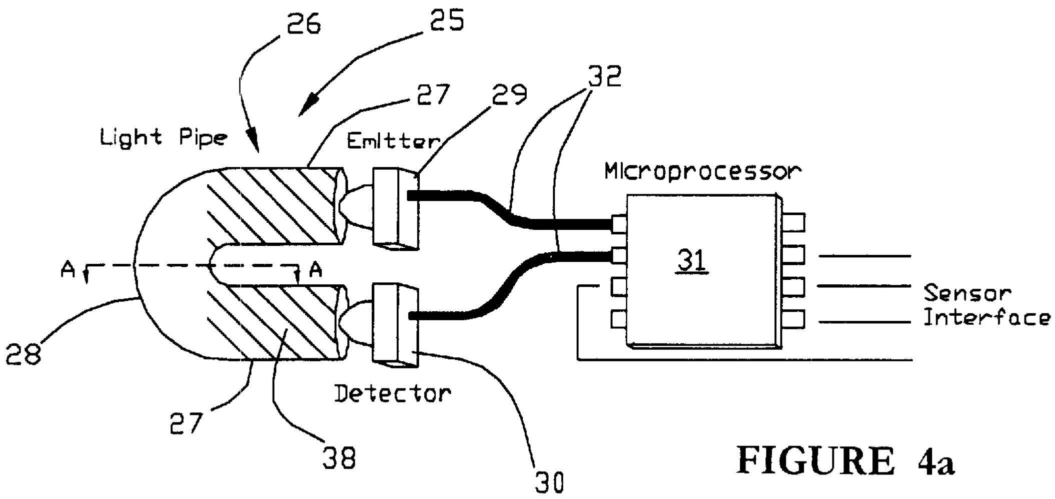
FIG. 4*a* illustrates several components of the optical level sensor of the present invention.
Figure 4B:
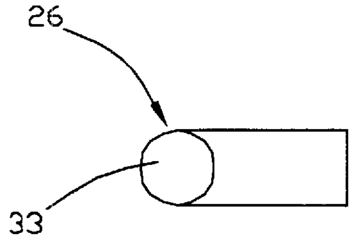
FIG. 4*b* illustrates a cross-section of the light tube taken along the line A—A.
Figure 4C:
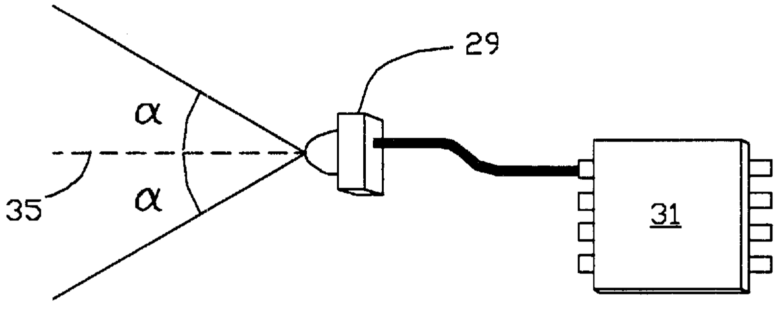
FIG. 4*c* illustrates the half angle focus of the sensor emitter and detector.

Optical sensor 25 is seen more fully in FIGS. 4(*a*)–4(*c*). FIG. 4(*a*) illustrates how sensor 25 will generally comprise a light tube 26, a light emitter 29, a light detector 30, and a micro-controller 31 connected to emitter 29 and detector 30 by conductors 32. Light tube 26 will further comprise two generally straight sections 27 connected by bend 28. The length of straight sections 27 is not critical. The sections could have a length as short as one diameter of light tube 26. The length is more likely to be governed by the need for straight sections 27 to have sufficient length to allow the potting material to securely hold light tube 26 in place depending upon the specific location and implementation. It is believed that a straight section length of 1 to 10 diameters is suitable for the applications mentioned herein, but longer or shorter straight section lengths may be desirable in other applications. In the embodiment shown, bend 28 has a substantially continuous curvature and as seen in FIG. 4(*b*), bend 28 has a substantially circular or rounded cross-section 33. In other words, bend 28 is substantially free of any flat surfaces. Typically, light tube 26 will be constructed of a light conducting material having a refractive index of between approximately 1.2 and approximately 1.7 and more preferably between approximately 1.4 and approximately 1.6. In one preferred embodiment, light tube 26 is constructed of borosilicate glass having a refractive index of approximately 1.5.

In the embodiment shown, emitter 29 is a light emitting diode while detector 30 is a photosensitive transistor. Emitter 29 and detector 30 are also narrow focus emitters and detectors. The degree of focus may be measured by the "half-angle" of the device as seen in FIG. 4(*c*). If axis 35 is the center focus of light emitted from emitter 29, the half angle is that angle $\alpha$ beyond which the light intensity or power is reduced by one half. In the case of a detector, the half angle is the angle of light at which the detector will register only half the power of the incoming light source. In the embodiment shown in the figures, the half angle of emitter 29 and detector 30 will be no greater than 30° and more preferably, approximately 15° or less. As suggested by FIG. 4(*a*), emitter 29 and detector 30 will be positioned against or very close to the ends of their respective straight sections 27 of light tube 26. This close proximity helps insure that the narrowly focused source of light is entering light tube 26 and that light travelling axially up straight section 27 is most likely to be detected by detector 30. Suitable emitters 29 and detectors 30 are available from QT Optoelectronics located in Sunnyvale, Calif. under the designations QEB373 and QSB363, respectively.

The combination of the narrow focus emitters/detectors and continuous curvature bend 28 offers several advantages over prior art optical sensors. A narrowly focused emitter requires less power in order to emit a sufficient quantity of light to be detected at the opposite end of light tube 26. Additionally, light tube 26 may be placed in close proximity to reflective surfaces. The greater the quantity of light transmitted by emitter 29, the greater the possibility that light will exit tube 26, reflect off some surface, and then return to detector 30 as a false signal. In the same manner, the narrow focus of detector 30 decreases the likelihood that stray light sources will generate a false signal by reaching detector 30 from angles other than parallel to straight section 27 of light tube 26. The continuous curvature and rounded cross-section of bend 28 also contribute to reducing the likelihood of receiving false signals. This is because light rays from outside light tube 26 will have more difficulty entering the light tube at a continuously curved section of glass. This is a distinct advantage over certain prior art light tubes which have flat surfaces and are likely to admit external light rays striking normal to that flat surface. When sensor 25 is potted into the surrounding pump structure as seen in FIG. 2, it has been found desirable to employ a white, non-light absorbing potting material. This potting material will cover straight sections 27 and the inside or convex portion of bend 28 as illustrated by shading 38 in FIG. 4(*a*).

As suggested by FIG. 4(*a*), emitter 29 and detector 30 will be connected to micro-controller 31. In the embodiment shown, micro-controller 31 may be a micro-processor such as that produced by Atmel Corporation of San Jose, Calif. and available under part designation ATiny11. Since micro-controller 31 can precisely control the turning on and off of emitter 29 and read the corresponding signals received by detector 30, this allows micro-controller 31 to distinguish between light signals from emitter 29 and various sources of background light which may reach detector 30. In effect, micro-controller 31 will activate emitter 29 in a coded sequence and determine whether light signals received by detector 30 are in that coded sequence. This will establish whether the signals come from emitter 29 or from other sources. The combination of a narrow focused light emitter and a coded sequence light signal results in the system being able to reliably detect a lower intensity light source. This in turn allows the system to be operated with significantly less power.

Although the figures illustrate sensor 25 being controlled by micro-controller 31, it will be readily apparent that alternative control circuitry could be employed. Thus, the control circuitry could include not only micro-controller 31, but alternatively could include discrete circuitry elements such as logic chips, electrical relays, programmable logic arrays and similar devices.

Because of the control allowed by micro-controller 31, a large number diagnostic and analysis test may be run from micro-controller 31. Tests may be simple state verification, timing related tests, or both. Illustrative examples of such tests are as follows.

A simple state verification test may be conducted by maintaining the emitter in an off state and verifying that no light is received by the detector. If light is detected, this may mean an external light source is blocking proper operation, a short in the emitter circuit is preventing the emitter from being turned off, or a short of the detector is always indicating an on state. All of these conditions are faults. If no light is detected, it may indicate proper operation. However, an open emitter or detector circuit, or a damaged light pipe would not be found by this test alone Additional tests must be made.

A second simple state verification test comprises maintaining the emitter in the on state and verifying that light is received by the detector. If light is not detected, it may mean that the emitter circuit is open, the light pipe is damaged, the detector is open, or liquid is in contact with the light pipe. If light is detected, it means the detector is dry and the light pipe and electronics are undamaged, or that the emitter is shorted on, or the detector is open. If combined with test one above, all possible failure states can be detected if the sensor is known to be dry. However, with only these two tests, micro-controller 31 can not tell the difference between a wet sensor and a failure of the optic path. This requires additional test circuits controlled by the micro-controller 31, but is usually not necessary. The sensor operation can be visually verified and failures of this type would indicate a wet optic, which is usually the safest failure mode.

A third test consists of starting with the emitter turned off, turning the emitter on, and using the micro-controller 31 to measure the time required for the detector to receive the light. By using the external limiting resistance and the stray capacitance of the detector, the time constant for charging the resulting circuit to the detection threshold can be used to verify that the emitter detector sensitivity is approximately correct. This test cannot determine if a detected fault is due to the emitter or the detector, but only whether one exists. This test also cannot be conducted effectively while the sensor is wet, since no response is expected. High levels of external light will also place the detector near the threshold and cause the response time to be too fast.

A fourth test consists of starting with the emitter turned on, turning the emitter off, and using the micro-controller 31 to measure the time required for the detector to indicate no light is detected. This is similar to test 3, and detects similar problems.

Active tests, using additional circuits controlled by the micro-controller 31, may also used in testing. However, it is not necessary to list such tests here. The sophistication and accuracy of these tests are limited only by the power of the micro-controller 31 and amount of additional hardware that is applied. In addition, due to the speed of the micro-controller 31, a large number of these tests can be run in a fraction of a second, allowing all of the results to be taken into account, by means of averaging, filtering, counting, or other algorithms. The results of such tests can be used to help the sensor reject noise and other intermittent outside influences that would otherwise cause a temporary false reading.

Sensor 25 has application not only has a controller for turning pump 18 on and off, but also a simply as an indicator of whether fluid is present in the wet line. The prior art liquid detecting gauges for wet lines typically consists of a transparent glass or plastic housing positioned on the side of the wet line. Apertures communicate between the interior of the wet line and a space formed in the housing. A float ball positioned in said housing would rise or fall depending on the presence of liquid in the wet line. This prior art liquid gauge has several drawbacks, including that the glass or plastic would become discolored and the ball difficult to see. It is also very difficult to this gauge at night, even with the aid of a flashlight.

Figure 5B:
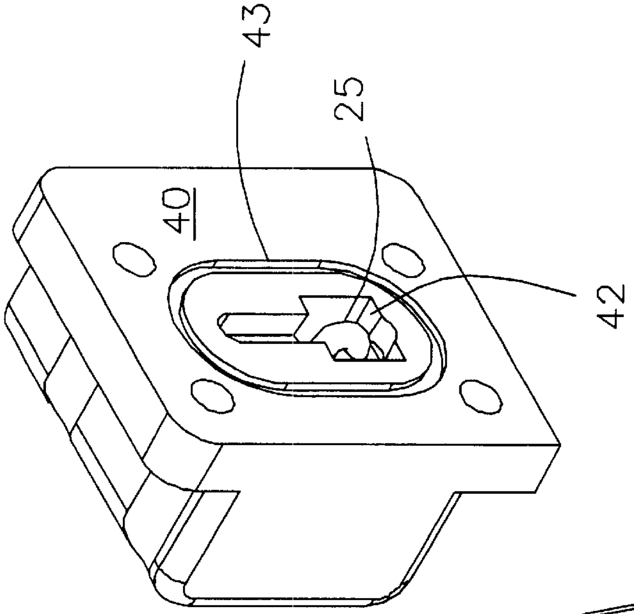
FIG. 5*b* illustrates the sensor housing of FIG. 5*a* from another perspective.
Figure 5A:
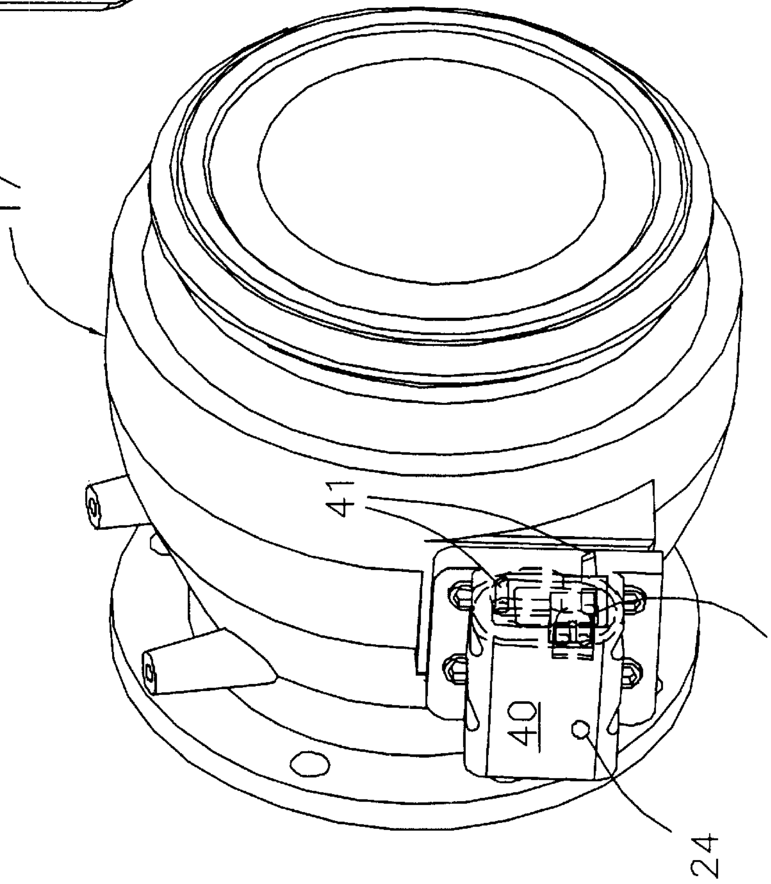
FIG. 5*a* illustrates a sensor housing attached to an API adapter without the pump seen in FIG. 2.

FIG. 5*a* illustrates how optical sensor 25 may be converted to a compact fluid detection unit easily mounted on API adapter 25. Rather than sensor 25 being attached to and activating pump 18, sensor 25 is situated in a separate sensor housing 40. Apertures 41 extend through the wall of API adapter 17 and allow fluid in the wet line to flow into and out of housing 40. FIG. 5*b* shows the reverse side of housing 40 seen in FIG. 5*a*. FIG. 5*b* illustrates how a cavity 42 is formed within housing 40 and sensor 25 extends into cavity 42. It will be apparent that when fluid is present in wet line 10, the fluid will flow through apertures 41 and enter cavity 42. This allows sensor 25 to detect the fluid. Similarly, as the wet line empties of fluid, fluid will drain out of cavity 42 and sensor 25 will detect the dry condition. Sensor 25 will detect the presence or absence of fluid and indicate this state by illuminating or not illuminating the LED 24 seen in FIG. 5*a*. While not explicitly shown in the drawings, it will be understood that a conventional gasket will be positioned in gasket channel 43 and form a seal with the side of API adapter 17. It will be understood that micro-controller 31 seen in FIG. 4*a* may also be located in housing 40.

As discussed above, optical sensor 25 will have low operating power requirements and this provides many advantages for a compact wet line optical liquid sensor. The low power requirements allow a single battery (such as a Panasonic BR-CT2SP) to power the sensor for long periods of time (one or more years). Additionally, because very low current is being used (in the range of 100–500 $\mu$A), it is considerably easier and more economical to meet the stringent safety standards required of electrical circuitry used in proximity to combustible fuels. These and the other considerations discussed above make sensor 25 a significant improvement in the art.

Figure 6:
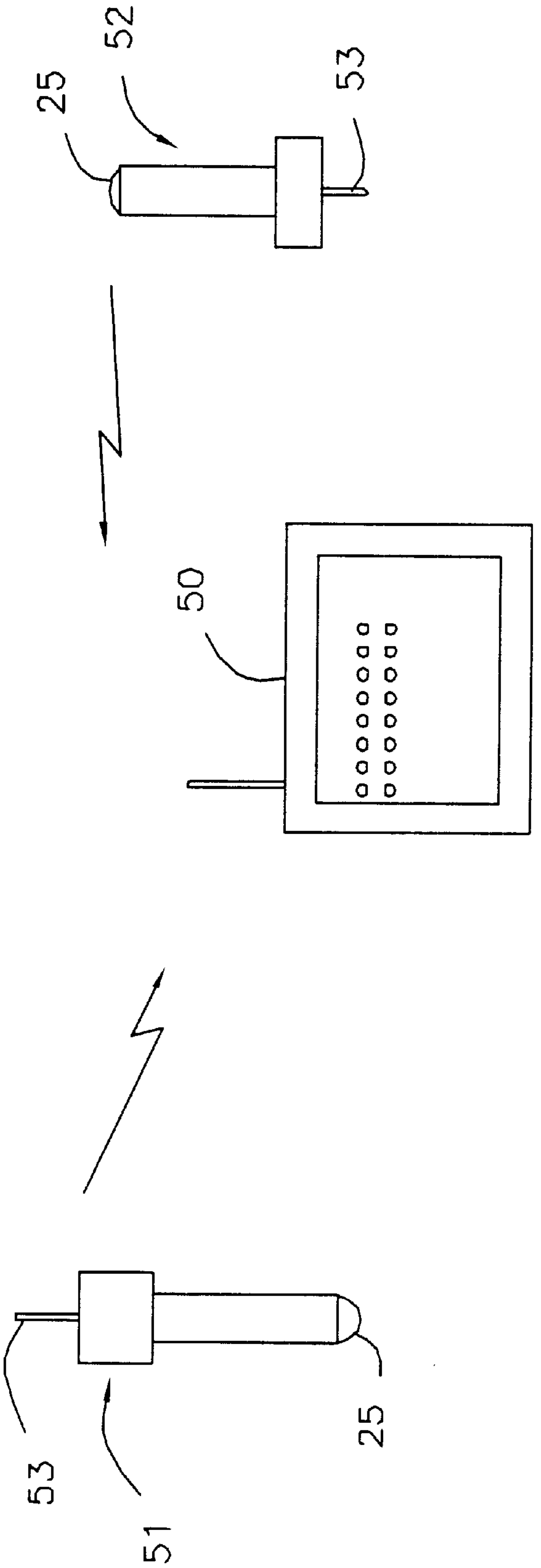
FIG. 6 illustrates a wireless overfill detection system.

A further embodiment of sensor 25 is suggested in FIG. 6. In this embodiment, the sensor 25 is used in an overfill detection mode. Overfill detection sensors are positioned in the upper portion of a cargo container at the desired maximum height of fluid in the cargo container. The overfill sensors detect when fluid has reached this maximum level and send a signal to a control device which controls the loading station pumping fluid into the cargo container. The control device then stops further pumping of fluid into container. Overfill detection systems also often include retain sensors which are similar to overfill sensors, but are positioned in the bottom of the cargo container. A retain sensor is intended to indicate whether there is any residual fluid in the bottom of the cargo container prior to pumping new fluid into the container. Typically, in prior art overfill detection systems, wires run from the sensors to electrical connections positioned where operator may easily access them. When the container is positioned adjacent to the loading station, electrical connectors from the sensor wires are coupled with an electrical connectors leading to the control device. Various safety precautions must be employed when making these electrical connections in an area where gasoline is being transferred.

The overfill detection system seen in FIG. 6 includes an overfill sensor 51, a retain sensor 52, and a control module 50. Both overfill sensor 51 and retain sensor 52 will comprise optical sensors 25 (as described in reference to FIGS. 4*a*–4*c*) and a wireless transmitter built into overfill sensor 51 and retain sensor 52. In the embodiment shown, the wireless transmitters are radio transmitters as suggested by the antennae 53. However, other wireless transmitting means, such as infrared transmitters, may also be employed. Control module 50 will be designed with a wireless receiver to receive the type of signal generated by overfill sensor 51 and retain sensor 52. In operation, when the optical sensor 25 detects the presence of liquid, the micro-controller of optical sensor 25 will cause the wireless transmitter to send the appropriate signal to control module 50.

The use of a wireless overfill detection system has many advantages over the prior art. It will not be necessary to run signal wires along the container to a point where an electrical connector may be accessed by an operator. Additionally, the wireless system eliminates the need for the operator to connect the overfill detector to the control module. Finally, the absence of electrical connections running between the overfill detector and the control module eliminates a substantial safety concern.

Although certain preferred embodiments have been described above, it will be appreciated by those skilled in the art to which the present invention pertains that modifications, changes, and improvements may be made without departing from the spirit of the invention as defined by the claims. All such modifications, changes, and improvements are intended to come within the scope of the present invention.

We claim:

1. A system for the return of residual liquid remaining in a loading line to a liquid cargo tank after loading or unloading of said cargo tank, said system comprising:

a. a liquid return line extending between said loading line and said cargo tank;

b. a pump drawing liquid from said loading line, through said pump, through said liquid return line, and into said cargo tank; and c. a vapor line communicating between a vapor space in said cargo tank and said loading line.

2. The system according to claim 1, wherein said liquid return line has an inlet at a lower portion of said loading line and said vapor line has an inlet at an upper portion of said loading line.

3. The system according to claim 1, wherein vapor from said vapor space is transferred to said loading line at approximately ambient pressure.

4. The system according to claim 1, wherein a sensor activates said pump when liquid in said loading line reaches a predetermined level.

5. The system according to claim 4, wherein said sensor is a optical sensor comprising a light transmitting tube extending into a portion of said loading line.

6. In a liquid cargo tank having a loading line communicating therewith, a system for the returning to said liquid cargo tank the residual liquid remaining in said loading line after loading or unloading of said cargo tank, said system comprising:

a. a liquid return line extending between said loading line and said cargo tank;

b. a pump positioned to move liquid from said loading line, through said liquid return line, and into said cargo tank; and c. a vapor line communicating between a vapor space in said cargo tank and said loading line, as liquid is moved from said loading line wherein as liquid is moved from said loading line vapor from said vapor space is transferred to said loading line at approximately ambient pressure.

7. In a liquid cargo tank having a loading line communicating therewith, a method for the returning to said liquid cargo tank the residual liquid remaining in said loading line after loading or unloading of said cargo tank, said method comprising the steps of:

a. pumping liquid in said loading line into said cargo tank; and b. during pumping of said liquid supplying vapor gases from a vapor space in said cargo tank to said loading line at approximately ambient pressure and in proportion to the amount of liquid removed from said loading line.

8. An optical liquid level sensor comprising:

a. a light tube having two substantially straight sections joined by a substantially continuous curvature bend, said bend having a rounded cross-section;

b. an optical emitter positioned at an end of one of said straight sections of said tube, said emitter emitting light at a half angle of between approximately 30° and approximately 12°;

c. an optical detector positioned at the other one of said straight sections of said tube; and d. control circuitry activating said optical emitter and monitoring said optical sensor.

9. An optical liquid level sensor according to claim 8, wherein said control circuitry includes a micro-controller.

10. An optical liquid level sensor according to claim 8, wherein said light pipe is constructed of borosilcate glass.

11. An optical liquid level sensor according to claim 8, wherein said emitter is in near contact with an end of one of said straight sections of said tube.

12. An optical liquid level sensor according to claim 9, wherein said micro-controller activates said emitter in a coded sequence.

13. The system according to claim 1, wherein a sensor activates an indicator light when liquid in said loading line reaches a predetermined level.

14. The system according to claim 4, wherein said sensor comprises:

a. a light tube having two substantially straight sections joined by a substantially continuous curvature bend, said bend having a rounded cross-section and said light pipe being formed of a light conducting material;

b. an optical emitter positioned at an end of one of said straight sections of said pipe;

c. an optical detector position at the other one of said straight sections of said pipe; and d. micro-controller activating said optical emitter and monitoring said optical sensor.

15. An optical liquid level sensor according to claim 9, wherein said sensor is connected to a wet line and uses an LED to indicate when fluid is present in said wet line.

16. An optical liquid level sensor according to claim 8, wherein said light tube has a diameter and said straight sections have a length between 1 and 10 diameters.

17. An optical liquid level sensor according to claim 8, wherein said sensor is connected to a wireless transmitter and said transmitter generates a signal to indicate when said sensor is in contact with fluid.

18. A wireless overfill detection system comprising:

a. an optical sensor positioned within a cargo tank to detect an overfill state;

b. a wireless transmitter connected to said sensor and generating a signal to indicate when said sensor is in contact with fluid; and c. a control module for receiving signals from said wireless transmitter and for further generating signals to control the flow of fluid into said cargo tank.

19. The wireless overfill detection system according to claim 18, wherein said wireless transmitter is a infra-red transmitter.

20. The optical liquid level sensor according to claim 8, wherein said substantially straight sections are joined to a single continuous curvature U-shaped bend.

* * * * *